No. 730,828. PATENTED JUNE 9, 1903.
F. H. JEANNIN.
SYSTEM OF PHASE TRANSFORMATION.
APPLICATION FILED OCT. 20, 1902.
NO MODEL.

Witnesses.
J. Ellis Glenn.
Helen Orford

Inventor.
Frank H. Jeannin.
by Albert G. Davis
Atty.

No. 730,828. Patented June 9, 1903.

UNITED STATES PATENT OFFICE.

FRANK H. JEANNIN, OF SCHENECTADY, NEW YORK, ASSIGNOR TO GENERAL ELECTRIC COMPANY, A CORPORATION OF NEW YORK.

SYSTEM OF PHASE TRANSFORMATION.

SPECIFICATION forming part of Letters Patent No. 730,828, dated June 9, 1903.

Application filed October 20, 1902. Serial No. 127,913. (No model.)

*To all whom it may concern:*

Be it known that I, FRANK H. JEANNIN, a citizen of the United States, residing at Schenectady, county of Schenectady, State of New York, have invented certain new and useful Improvements in Systems of Phase Transformation, of which the following is a specification.

My present invention relates to a means for transforming an alternating current of a given number of phases into an alternating current of a different number of phases and comprises various features of novelty, which I have set forth with particularity in the claims appended hereto.

For a better understanding of my invention reference is to be had to the following description, which is to be taken in connection with the accompanying drawings, in which—

Figure 1:
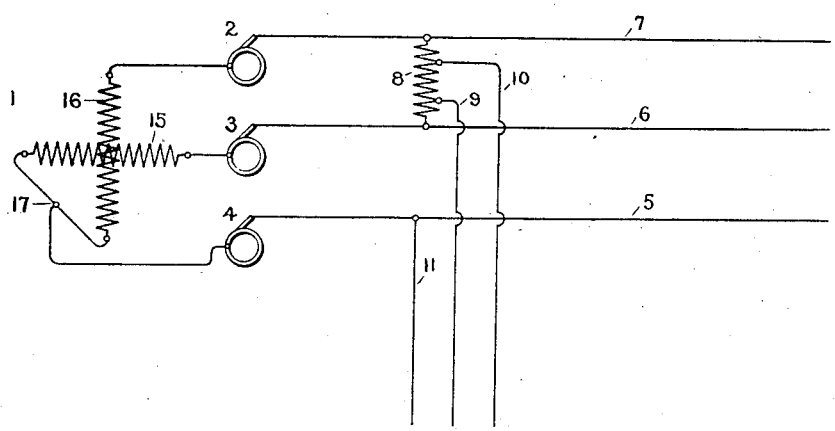
Figure 2:
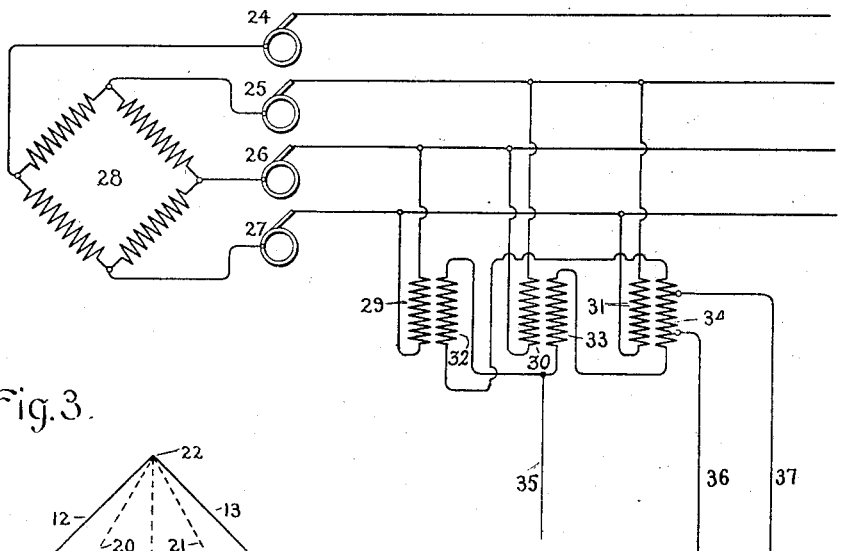

Figure 1 represents one embodiment of my invention; Fig. 2, a modification, and Fig. 3 an explanatory diagram.

The particular arrangements shown in the drawings are suitable for transforming quarter-phase currents into three-phase currents or vice versa; but it is to be understood that various features of my invention are not limited to use in this particular relation, but are capable of application in other relations as well.

In Fig. 1 a quarter-phase generator is represented conventionally at 1 and has two of its windings connected together, so that the three terminals 2 3 4 extending from the generator constitute, with the distribution system connected thereto, an interconnected three-wire quarter-phase system. The return-conductor 5 extends from the terminal 4 and the other conductors 6 and 7 from the remaining terminals 3 2 of the generator. A compensator 8 or some other winding or device giving rise to a counter electromotive force is connected across the two mains 6 7 of the quarter-phase system and has extending from intermediate points therein two leads 9 and 10. The points of connection of the leads 9 and 10 are so chosen that the voltage between these leads when associated with the voltages between each of these leads and a third lead 11, extending from the common return 5, constitutes a system of three-phase voltages. Three-phase currents may be derived from these leads and utilized for any desired purpose—such, for example, as supplying motors, lights, or the like.

Figure 3:
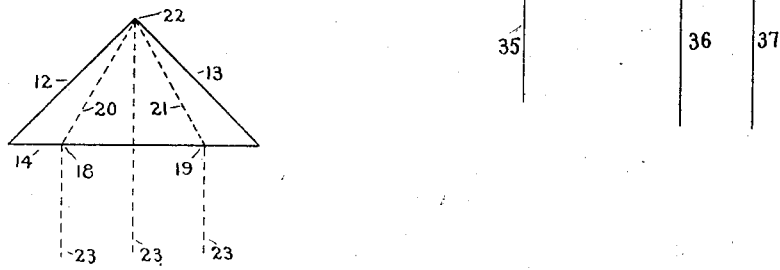

In order to make somewhat clearer the nature of the phase transformation taking place in the apparatus thus described, reference may be had to Fig. 3. In this figure the triangle, the sides of which are indicated at 12, 13, and 14, represents the relative magnitudes and phase relation of the voltages existing between the three mains 5, 6, and 7 of the quarter-phase system. This relation is one common in practice and in itself presents no elements of novelty. The side 12 of the triangle represents the voltage of one of the generating-windings, as 15, of the quarter-phase generator, and the other side, 13, the voltage of the other generating-winding, 16. These windings are connected together at 17 and the junction point to the common return 5. The voltage between the common return 5 and the main 6 therefore corresponds to the voltage of the generating-coil 15, while the voltage between the common return 5 and the other main 7 corresponds to the remaining generating-coils 16. The voltage between the two mains 6 and 7 is therefore the resultant of the voltages represented in Fig. 3 by the sides 12 and 13, and therefore corresponds to the hypotenuse 14 of the triangle.

If a certain "intermediate portion," so to speak, of the voltage 14 be impressed upon a pair of mains, then the voltages existing between these mains and the common return 5 of the system above described may, within limits, be made to have any phase angle desired. By taking the centrally-situated portion of this voltage lying between the points 18 19 equal to the two voltages represented by the dotted lines 20 and 21, extending from these points, respectively, to the apex 22 of the triangle, a symmetrical three-phase system of voltages may be derived. This, too, may be accomplished in practice in a variety of ways, one of the simpler forms of which consists of the compensator-winding 8 in Fig. 1, having the leads 9 10 extending therefrom, as heretofore described. The points of connection of these leads are chosen symmetrically with respect to the winding and so that the voltage between the leads is equal to the voltage between each of the leads and the common return 5. With this arrangement it is evident that the voltages between the leads 9, 10, and 11 correspond to the voltages indicated in Fig. 3 by the sides of the equilateral triangle, the angles of which are connected to the three dotted lines 23, corresponding to the three leads 9, 10, and 11 in Fig. 1.

In Fig. 2 a somewhat different arrangement is shown for securing the same general result as that performed by the arrangement represented in Fig. 1. In this system a four-wire quarter-phase system represented by the mains 24 25 26 27 is supplied with current from a quarter-phase generator 28 of any suitable type. Three transformers have their primaries 29, 30, and 31 connected, respectively, across the pairs of mains 26 27, 26 25, and 25 27. The three secondaries 32, 33, and 34, corresponding, respectively, to these primaries, are connected in series with each other, so that their voltages are represented in phase relation and as to relative magnitudes by the right-angled isosceles triangle already described in connection with Fig. 3. A main 35 extends from the junction between the secondaries 32 33, while two mains 36 and 37 are connected to intermediate points in the secondary 34, situated so that the voltage between the points is equal to each of the voltages between each point and the main 35, this relation of voltages being represented by the small equilateral triangle in Fig. 3, one side of which is contained between the points of connection 18 19 and the other two sides indicated by the numerals 20 and 21.

It will thus be evident that the mains or leads 35, 36, and 37 constitute the conductors of a three-phase system by which energy may be conveyed to or derived from the quarter-phase system already described, the transfer of energy being effected inductively instead of by a system such as shown in Fig. 1, in which the three-phase system is electrically connected at certain points to the quarter-phase system.

What I claim as new, and desire to secure by Letters Patent of the United States, is—

1. In a phase-transformation system, the combination of three-phase mains, a winding having two points intermediate its ends connected to two of said mains, and means for impressing quarter-phase electromotive forces between the third main and the ends of said winding.

2. In a system of phase transformation, the combination of three windings connected in series with each other, three-phase mains connected, one to the junction between two of the windings and the other two to intermediate points in the remaining winding, and a quarter-phase system inductively related to said windings.

3. In a system of phase transformation, the combination of three delta-connected windings, a quarter-phase alternating-current system inductively related to said windings, a set of three-phase mains, connections between one of said mains and the junction between two of said windings, and connections between the other three-phase mains and points in the third winding other than the junction points between said third winding and the other two.

In witness whereof I have hereunto set my hand this 18th day of October, 1902.

FRANK H. JEANNIN.

Witnesses:
BENJAMIN B. HULL,
HELEN ORFORD.